(12) United States Patent
Oikawa

(10) Patent No.: US 12,436,523 B2
(45) Date of Patent: Oct. 7, 2025

(54) CONTROL DEVICE FOR MACHINE TOOL

(71) Applicant: FANUC CORPORATION, Yamanashi (JP)

(72) Inventor: Kouki Oikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 136 days.

(21) Appl. No.: 18/549,545

(22) PCT Filed: Mar. 14, 2022

(86) PCT No.: PCT/JP2022/011373
§ 371 (c)(1),
(2) Date: Sep. 7, 2023

(87) PCT Pub. No.: WO2022/196646
PCT Pub. Date: Sep. 22, 2022

(65) Prior Publication Data
US 2024/0152116 A1 May 9, 2024

(30) Foreign Application Priority Data
Mar. 18, 2021 (JP) ................................. 2021-044443

(51) Int. Cl.
*G05B 19/416* (2006.01)
(52) U.S. Cl.
CPC .. *G05B 19/416* (2013.01); *G05B 2219/49108* (2013.01)
(58) Field of Classification Search
CPC ........ G05B 19/416; G05B 2219/49108; G05B 2219/41115; G05B 19/4163; G05B 19/404; B23Q 15/12
(Continued)

(56) References Cited

U.S. PATENT DOCUMENTS

| 6,936,990 B2 * | 8/2005 | Oyama .................. H02P 29/00 318/632 |
| 9,110,455 B2 * | 8/2015 | Ueno ................. G05B 19/4166 |
| 9,869,989 B2 * | 1/2018 | Yoshida .............. G05B 19/182 |

FOREIGN PATENT DOCUMENTS

| JP | 2012-091283 A | 5/2012 |
| JP | 2018-180990 A | 11/2018 |
| JP | 2020-196057 A | 12/2020 |

OTHER PUBLICATIONS

International Search Report issued in PCT/JP2022/011373; mailed May 24, 2022.

* cited by examiner

*Primary Examiner* — David Luo
(74) *Attorney, Agent, or Firm* — Studebaker Brackett PLLC

(57) ABSTRACT

Provided is a control device for a machine tool capable of reducing adverse effects due to rapid changes in periodic fluctuations in the rotation speed of a main spindle while maintaining an effect of suppressing regenerative self-excited chatter vibration. This control device for a machine tool includes a fluctuation command calculation unit configured to calculate a fluctuation command based on a speed command for a main spindle motor of the machine tool and a fluctuation condition for causing a rotation speed of the main spindle motor to periodically fluctuate, and a speed control unit configured to control the rotation speed of the main spindle motor based on the speed command and the fluctuation command. The fluctuation command calculation unit is configured to calculate, when the fluctuation condition is changed, the fluctuation command in which an amplitude of the rotation speed that periodically fluctuates and/or a frequency of the rotation speed that periodically fluctuates gradually changes.

2 Claims, 9 Drawing Sheets

(58) Field of Classification Search
USPC .................. 318/570, 571, 569, 567, 560
See application file for complete search history.

FLUCTUATION AMPLITUDE (BEFORE CHANGE)
500min⁻¹
↓
(AFTER CHANGE)
200min⁻¹

FLUCTUATION AMPLITUDE (BEFORE CHANGE)
500min⁻¹
↓
(AFTER CHANGE)
200min⁻¹

CONTROL DEVICE FOR MACHINE TOOL

TECHNICAL FIELD

The present disclosure relates to a control device for a machine tool.

BACKGROUND ART

During cutting by a machine tool, chatter vibration may be continuously generated between a tool and a workpiece. Chatter vibration is classified into forced chatter vibration and self-excited chatter vibration according to the cause of vibration generation. Forced chatter vibration is generated under the influence of a forced vibration source, while self-excited chatter vibration is generated without a specific vibration source when both the dynamic characteristics of the machine tool and the cutting process satisfy a predetermined condition. Among self-excited chatter vibration, regenerative self-excited chatter vibration is caused by variations in chip thickness.

Conventionally, there has been known a technique of suppressing regenerative self-excited chatter vibration by causing the rotation speed of a main spindle of a machine tool to periodically fluctuate (for example, see Patent Document 1).

Patent Document 1: Japanese Unexamined Patent Application, Publication No. 2012-091283

DISCLOSURE OF THE INVENTION

Problems to be Solved by the Invention

However, in the above technique, when there is a rapid change in the periodic fluctuation of the rotation speed of the main spindle, there are adverse effects such as mechanical shock and deterioration of the quality of the machined surface due to excessive speed deviation. Therefore, there has been awaited a control device for a machine tool capable of reducing adverse effects due to rapid changes in periodic fluctuations in the rotation speed of the main spindle while maintaining an effect of suppressing regenerative self-excited chatter vibration.

Means for Solving the Problems

A control device for a machine tool according to the present disclosure includes
  a fluctuation command calculation unit configured to calculate
  a fluctuation command based on a speed command for a main spindle motor of the machine tool and a fluctuation condition for causing a rotation speed of the main spindle motor to periodically fluctuate, and
  a speed control unit configured to control the rotation speed of the main spindle motor based on the speed command and the fluctuation command.
The fluctuation command calculation unit is configured to calculate, when the fluctuation condition is changed, the fluctuation command in which an amplitude of the rotation speed that periodically fluctuates and/or a frequency of the rotation speed that periodically fluctuates gradually changes.

Effects of the Invention

According to the present disclosure, it is possible to reduce adverse effects due to rapid changes in periodic fluctuations in the rotation speed of a main spindle while maintaining an effect of suppressing regenerative self-excited chatter vibration.

PREFERRED MODE FOR CARRYING OUT THE INVENTION

Figure 1:
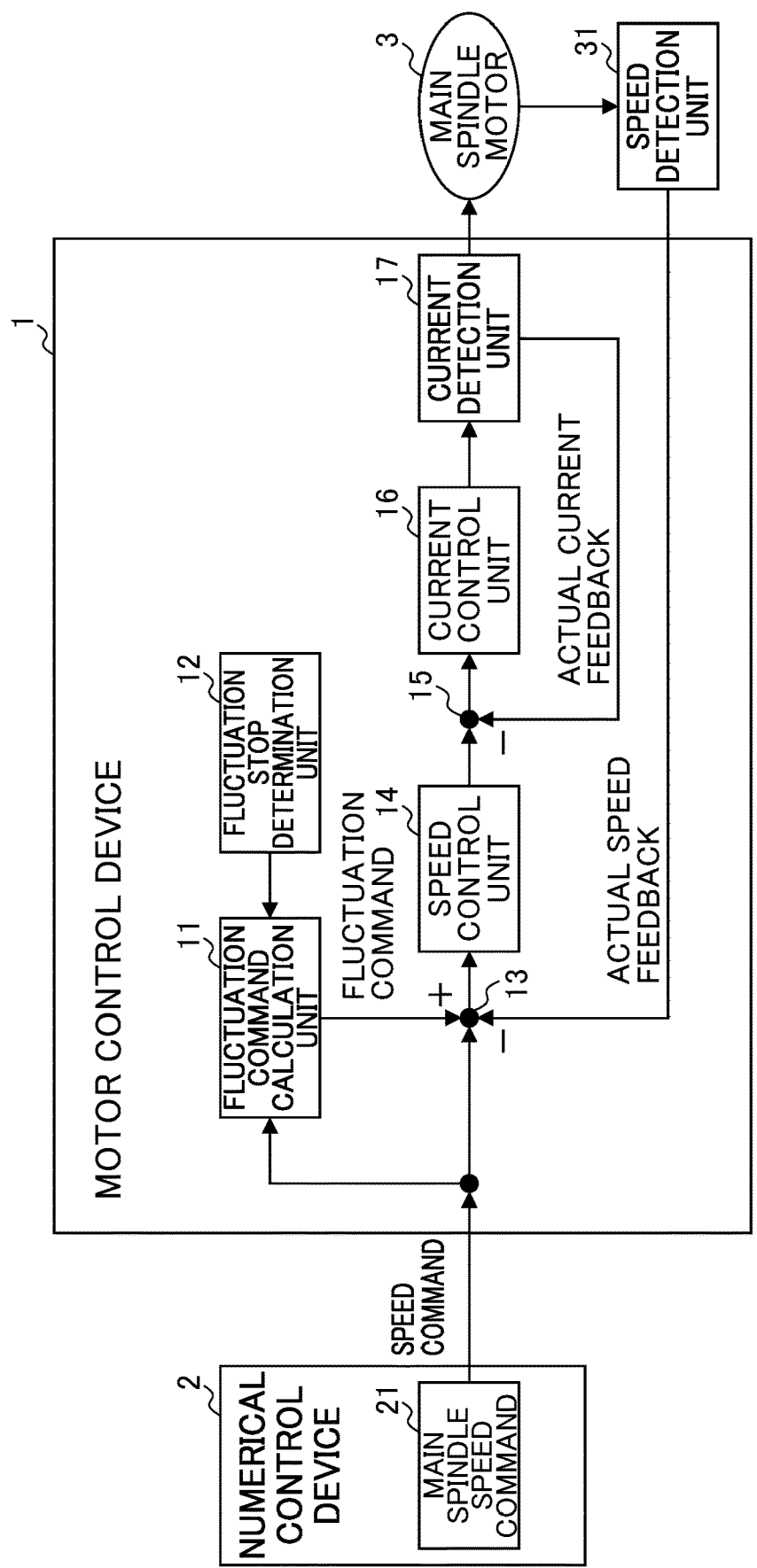
FIG. 1 shows an outline of a machine tool according to a first embodiment.

First, a first embodiment of the present disclosure will be described. FIG. 1 shows an outline of a machine tool according to the first embodiment.

The machine tool controls a motor control device 1 based on a speed command from a numerical control device 2 and rotates a main spindle motor 3 to perform predetermined machining such as cutting. This machine tool suppresses regenerative self-excited chatter vibration by causing the rotation speed of the main spindle motor 3 to periodically fluctuate, i.e., by sinusoidally vibrating the rotation speed of the main spindle motor 3.

The motor control device 1 includes a fluctuation command calculation unit 11, a fluctuation stop determination unit 12, a speed control unit 14, a current control unit 16, and a current detection unit 17.

The fluctuation command calculation unit 11 calculates a fluctuation command based on a fluctuation condition (amplitude and/or frequency) for causing a speed command for the main spindle motor 3 of the machine tool and the rotation speed of the main spindle motor 3 to periodically fluctuate, and outputs the fluctuation command as a signal. The fluctuation command calculation unit 11 calculates, when the fluctuation condition is changed, a fluctuation command in which the amplitude of the periodically fluctuating rotation speed of the main spindle motor 3 gradually changes, and outputs the fluctuation command as a signal. Specifically, the fluctuation command calculation unit 11 calculates, when receiving a signal of a stop command as a fluctuation condition from the fluctuation stop determination unit 12, a fluctuation command in which the amplitude of the periodically fluctuating rotation speed of the main spindle motor 3 attenuates (gradually decreases) to zero, and outputs the fluctuation command as a signal. As the attenuation amount of the amplitude of the periodically fluctuating rotation speed of the main spindle motor 3, a prescribed amount of change (time constant), a value to be input from a machining program, a value of a parameter to be set, or the like is employed. For the setting of the fluctuation condition, an input from a machining program, a parameter to be set, or the like is employed.

The fluctuation stop determination unit 12 calculates a stop command for stopping the fluctuation of the rotation speed of the main spindle motor 3 based on a predetermined trigger, and outputs the stop command as a signal. As the predetermined trigger, a signal to be input from the outside such as the numerical control device 2, an input from a machining program, a parameter to be set, or the like is employed.

Reference numeral 13 denotes that a value is input as a signal to the speed control unit 14, the value being obtained by adding, to the speed command value output as a signal from a main spindle speed commander 21, the fluctuation command value output as a signal from the fluctuation command calculation unit 11, and subtracting the actual speed feedback value output as a signal from the speed detection unit 31.

The speed control unit 14 calculates a command for controlling the rotation speed of the main spindle motor 3 based on the speed command and the fluctuation command, and outputs the command as a signal.

Reference numeral 15 denotes that a value is input as a signal to the current control unit 16, the value being obtained by subtracting, from the command output value as a signal from the speed control unit 14, the actual current feedback value output as a signal from the current detection unit 17.

The current control unit 16 calculates a voltage command for driving the main spindle motor 3 based on the input signal, and outputs the voltage command as a signal.

The current detection unit 17 detects a signal that is a current value of the main spindle motor 3, and outputs a detection result as a signal of actual current feedback.

The numerical control device 2 includes the main spindle speed commander 21. The main spindle speed commander 21 calculates a speed command for the main spindle motor 3 and outputs it as a signal.

The main spindle motor 3 rotates under the control of the motor control device 1. The speed detection unit 31 detects the rotation speed of the main spindle motor 3 and outputs a detection result as a signal of actual speed feedback. As the speed detection unit 31, an encoder or the like is employed.

Figure 2:
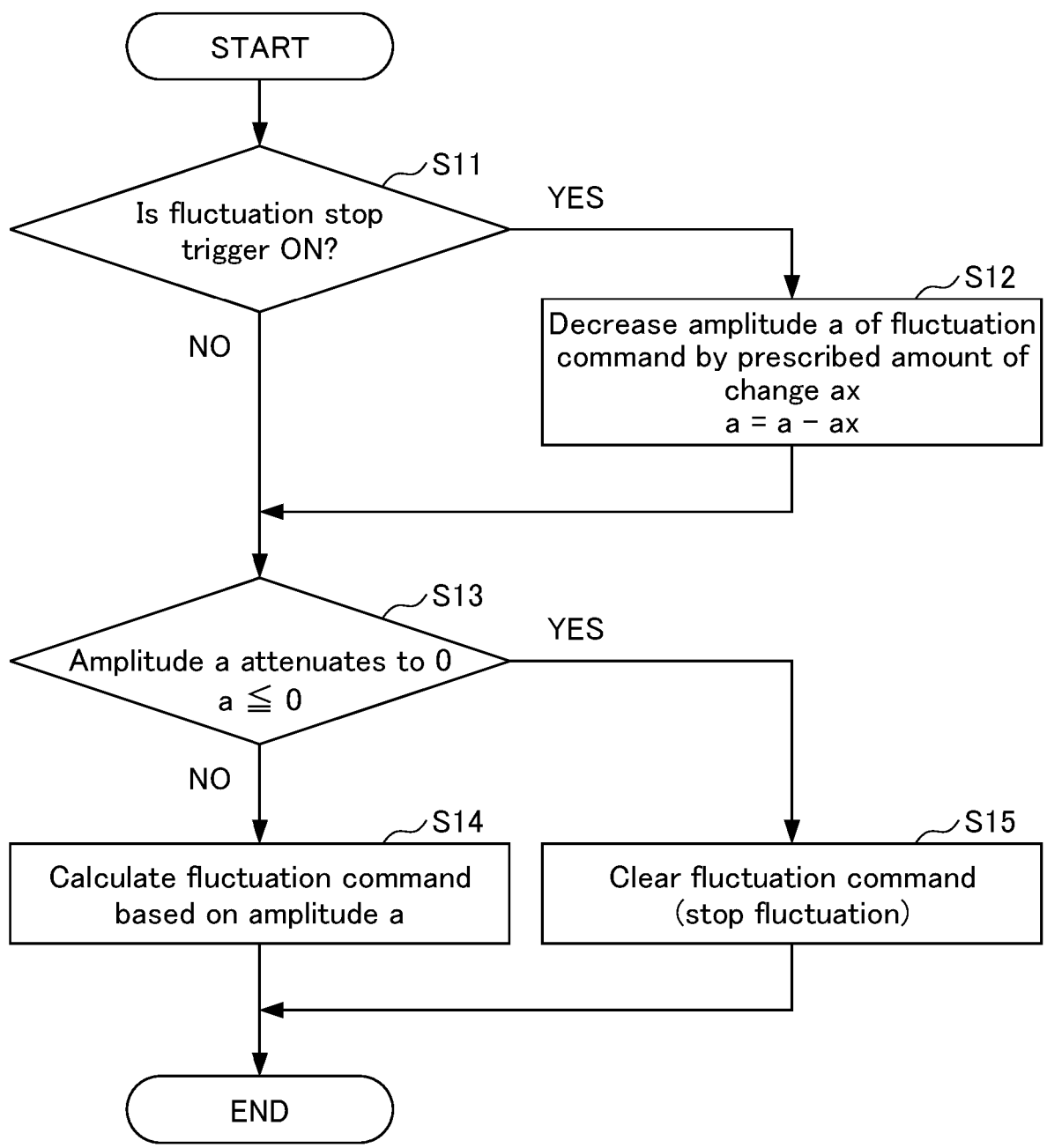
FIG. 2 is a flowchart showing a flow of processing of a motor control device according to the first embodiment.

FIG. 2 is a flowchart showing the flow of processing of the motor control device 1 according to the first embodiment.

The processing shown in FIG. 2 is repeatedly executed every calculation period (control period) of the fluctuation command.

When the fluctuation command calculation unit 11 receives a stop command signal as a fluctuation condition from the fluctuation stop determination unit 12 (if YES in Step S11), the processing advances to Step S12. On the other hand, when the fluctuation command calculation unit 11 does not receive a stop command signal as a fluctuation condition from the fluctuation stop determination unit 12 (if NO in Step S1*l*), the processing advances to Step S13.

In Step S12, a value (a−ax) obtained by decreasing the amplitude a (the amplitude a of the fluctuation command) of the periodically fluctuating rotation speed of the main spindle motor 3 by a prescribed amount of change ax (x: a positive value less than 1) is set as a new amplitude a, and the processing advances to Step S13.

When the amplitude a of the periodically fluctuating rotation speed of the main spindle motor 3 attenuates to zero (if YES in Step S13), the processing advances to Step S15. On the other hand, when the amplitude a of the periodically fluctuating rotation speed of the main spindle motor 3 does not become zero (if NO in Step S13), the processing advances to Step S14.

In Step S14, the fluctuation command calculation unit 11 calculates a fluctuation command based on the amplitude a calculated in Step S12. On the other hand, in Step S15, the fluctuation command calculation unit 11 does not calculate a fluctuation command.

Figure 3:
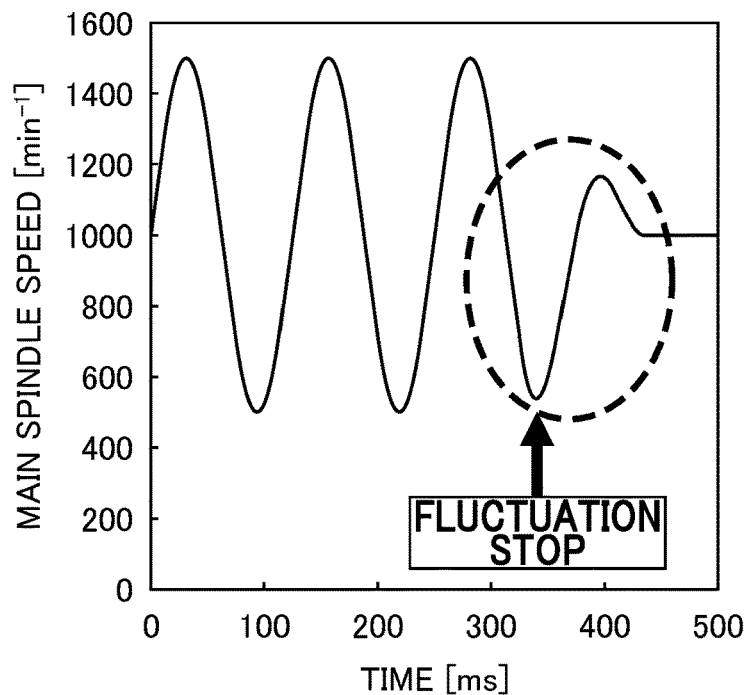
FIG. 3 shows a time history in a case where the periodic fluctuation of the rotation speed (main spindle speed) of a main spindle motor is stopped in the first embodiment.

FIG. 3 shows a time history in a case where the periodic fluctuation of the rotation speed (main spindle speed) of the main spindle motor 3 is stopped in the first embodiment. As shown in FIG. 3, when the periodic fluctuation of the main spindle speed of 1000±500 [min$^{-1}$] is stopped, the amplitude of the main spindle speed gradually attenuates to zero. Thus, in the present embodiment, since the steepness of the speed change is made gentle, adverse effects on the quality of the machined surface are reduced.

Figure 4:
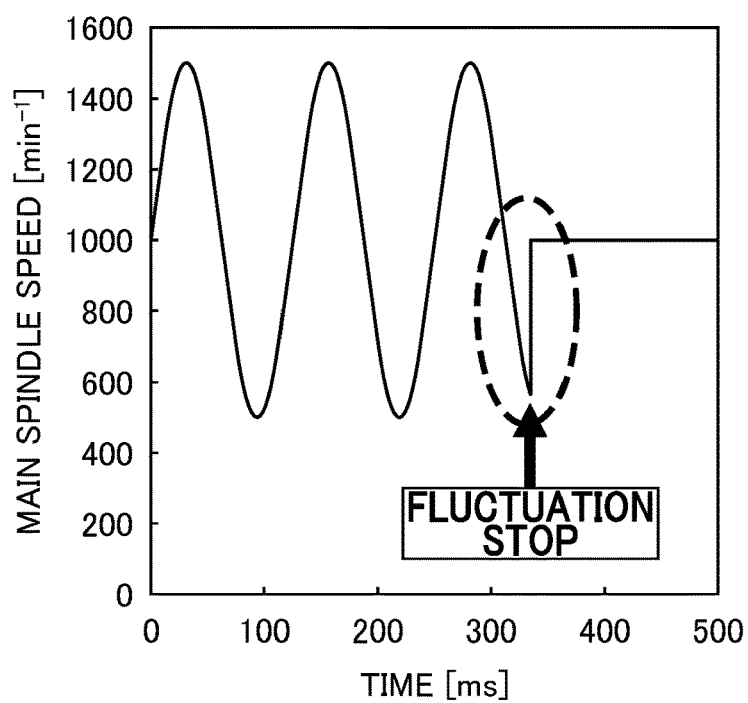
FIG. 4 shows a time history in a case where the periodic fluctuation of the rotation speed (main spindle speed) of a conventional main spindle motor is stopped.

In contrast, FIG. 4 shows a time history in a case where the periodic fluctuation of the rotation speed (main spindle speed) of a conventional main spindle motor is stopped. As shown in FIG. 4, when the periodic fluctuation of the conventional main spindle speed of 1000±500 [min$^{-1}$] is stopped, the amplitude of the main spindle speed suddenly becomes zero. Thus, conventionally, a mechanical shock occurs due to a rapid speed change, and the quality of the machined surface deteriorates due to an excessive speed deviation.

As described above, the motor control device 1 according to the first embodiment includes the fluctuation command calculation unit 11 that calculates a fluctuation command based on a speed command for the main spindle motor 3 of the machine tool and a fluctuation condition for causing the rotation speed of the main spindle motor 3 to periodically fluctuate, and the speed control unit 14 that controls the rotation speed of the main spindle motor 3 based on the speed command and the fluctuation command. The fluctuation command calculation unit 11 calculates, when the fluctuation condition is changed, the fluctuation command in which the amplitude of the rotation speed that periodically fluctuates gradually changes. Since this allows the steepness of the speed change to be gentle, it is possible to reduce adverse effects due to a rapid change in the periodic fluctuation in the rotation speed of the main spindle motor 3 while maintaining an effect of suppressing regenerative self-excited chatter vibration.

The motor control device 1 further includes the fluctuation stop determination unit 12 that calculates a stop command for stopping the fluctuation of the rotation speed based on a predetermined trigger. The fluctuation command calculation unit 11 calculates, when receiving the stop command as a fluctuation condition, the fluctuation command in which the amplitude of the rotation speed that periodically fluctuates attenuates to zero. As a result, particularly at the time of stop, it is possible to reduce adverse effects due to a rapid stop of the periodic fluctuation in the rotation speed of the main spindle motor 3 while maintaining an effect of suppressing regenerative self-excited chatter vibration.

Figure 5:
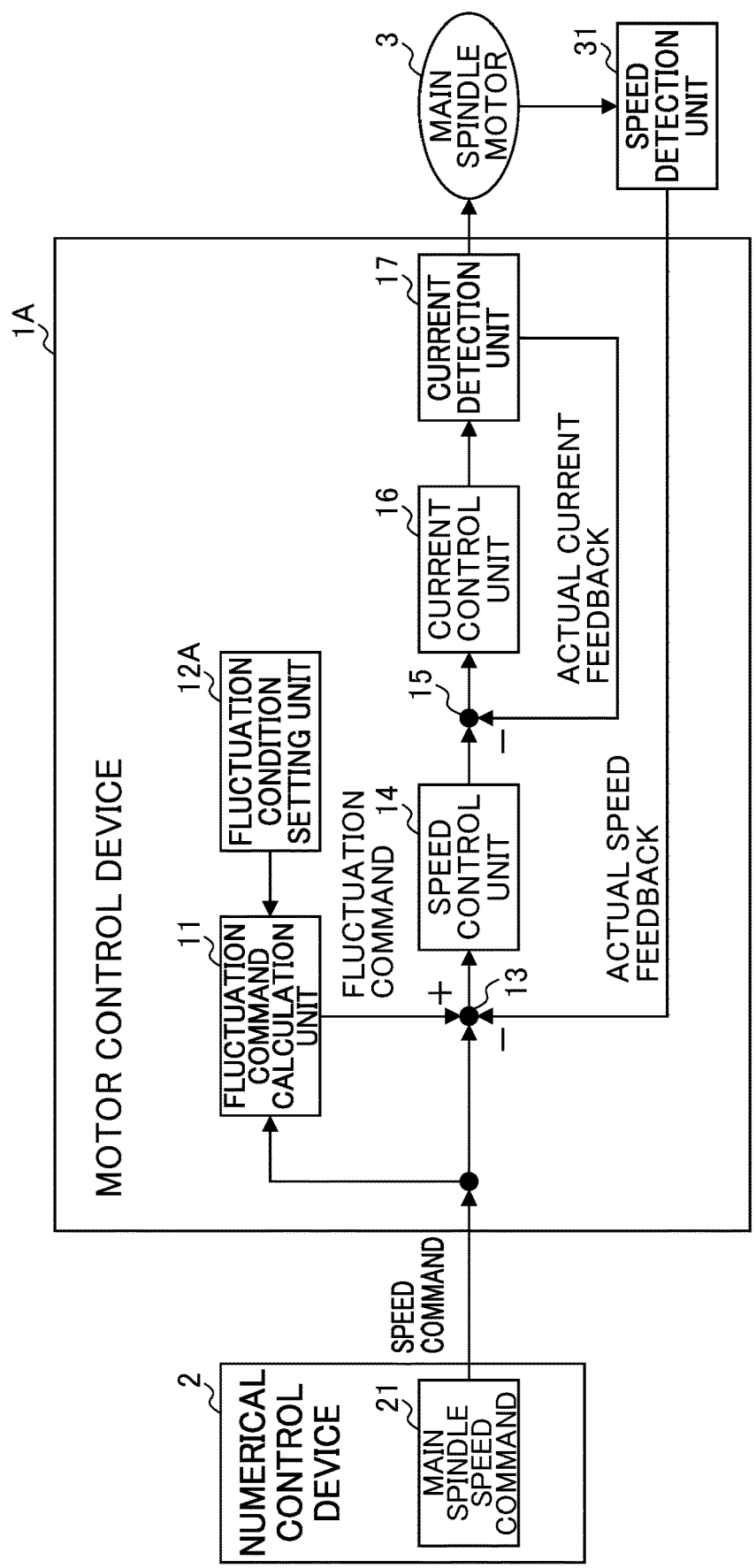
FIG. 5 shows an outline of a machine tool according to a second embodiment.

Next, a second embodiment of the present disclosure will be described. FIG. 5 shows an outline of a machine tool according to the second embodiment. In the description of the second embodiment, the same components, functions, and effects as those of the first embodiment are denoted by the same reference numerals, and descriptions thereof are omitted as appropriate.

The machine tool shown in FIG. 5 differs from the machine tool according to the first embodiment in that the machine tool includes a motor control device 1A instead of the motor control device 1. The motor control device 1A differs from the motor control device 1 in that the motor control device 1A includes a fluctuation condition setting unit 12A instead of the fluctuation stop determination unit 12.

The fluctuation command calculation unit 11 calculates, when the fluctuation condition is changed, a fluctuation command in which the amplitude of the rotation speed that periodically fluctuates and/or the frequency of the rotation speed that periodically fluctuates is gradually changed. Specifically, the fluctuation command calculation unit 11 compares, when the fluctuation condition is changed, the values of the amplitude of the periodically fluctuating rotation speed and/or the frequency of the periodically fluctuating rotation speed before and after the change. The fluctuation command calculation unit 11 calculates, when the value after the change is greater than the value before the change, a fluctuation command in which the amplitude of the periodically fluctuating rotation speed and/or the frequency of the periodically fluctuating rotation speed gradually increases. The command calculation unit 11 calculates, when the value after the change is smaller than the value before the change, a fluctuation command in which the amplitude of the periodically fluctuating rotation speed and/or the frequency of the periodically fluctuating rotation speed attenuates.

The fluctuation condition setting unit 12A sets a fluctuation condition (amplitude and/or frequency) for causing a speed command for the main spindle motor 3 of the machine tool and the rotation speed of the main spindle motor 3 to periodically fluctuate, and outputs it as a signal. For the setting of the fluctuation condition, an input from a machining program, a parameter to be set, or the like is employed.

Figure 6:
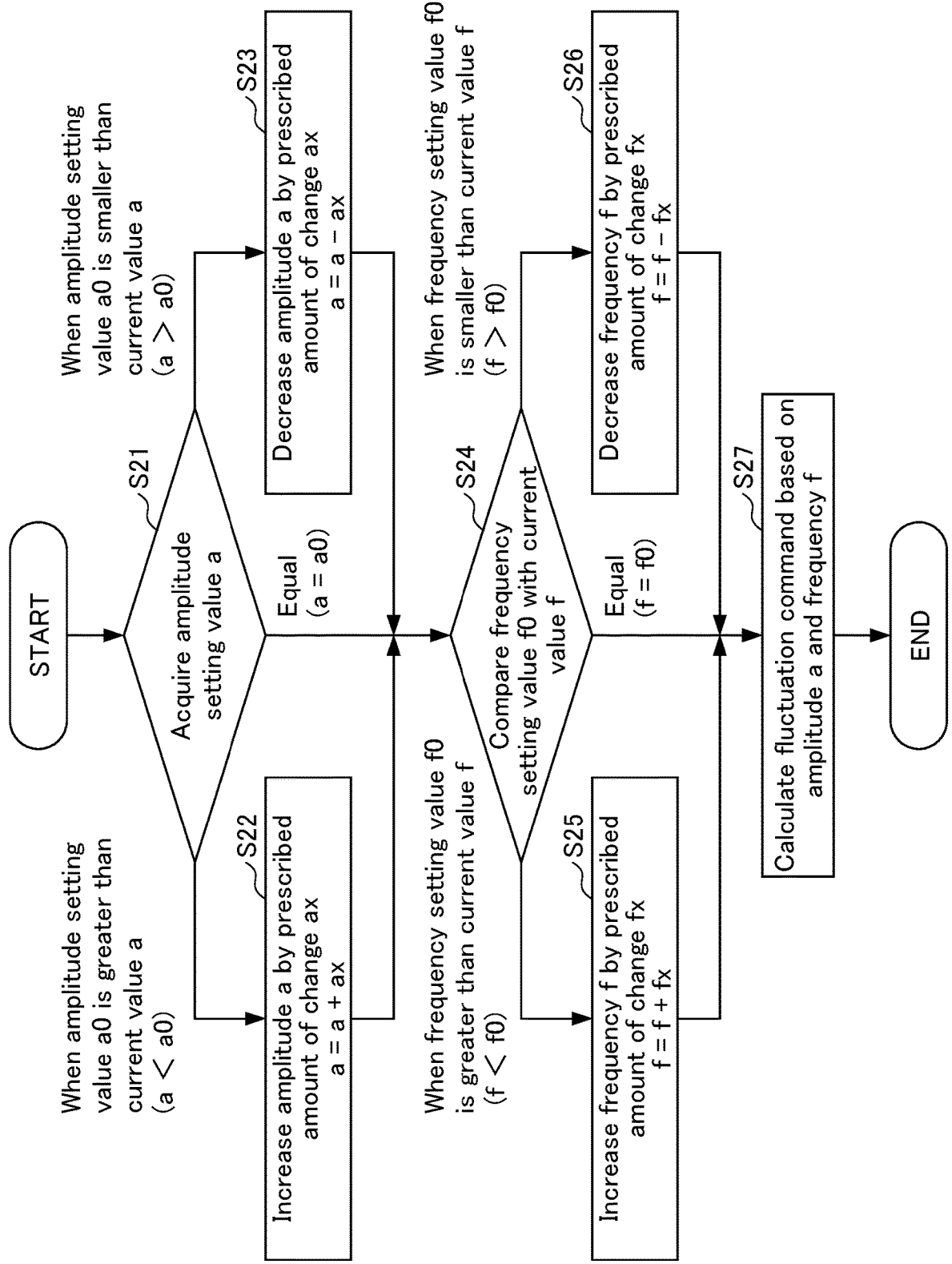
FIG. 6 is a flowchart showing the flow of processing of a motor control device according to the second embodiment.

FIG. 6 is a flowchart showing the flow of processing of the motor control device 1A according to the second embodiment. The processing shown in FIG. 6 is repeatedly executed every calculation period (control period) of the fluctuation command.

In Step S21, the fluctuation command calculation unit 11 compares an amplitude setting value a0 received as a fluctuation condition signal from the fluctuation condition setting unit 12A with the current amplitude a. When the amplitude setting value a0 is greater than the current amplitude a, the processing advances to Step S22. When the amplitude setting value a0 is equal to the current amplitude a, the processing advances to Step S24. When the amplitude setting value a0 is smaller than the current amplitude a, the processing advances to Step S23.

In Step S22, a value (a+ax) obtained by increasing the amplitude a of the periodically fluctuating rotation speed of the main spindle motor 3 by a prescribed amount of change ax (x: a positive value less than 1) is set as a new amplitude a, and the processing advances to Step S24.

In Step S23, a value (a−ax) obtained by decreasing the amplitude a of the periodically fluctuating rotation speed of the main spindle motor 3 by a prescribed amount of change ax (x: a positive value less than 1) is set as a new amplitude a, and the processing advances to Step S24.

In Step S24, the fluctuation command calculation unit 11 compares a frequency setting value f0 received as a fluctuation condition signal from the fluctuation condition setting unit 12A with the current frequency f. When the frequency setting value f0 is greater than the current frequency f, the processing advances to Step S25. When the frequency setting value F0 is equal to the current frequency f, the processing advances to Step S27. When the frequency setting value f0 is smaller than the current amplitude f, the processing advances to Step S26.

In Step S25, a value (f+fx) obtained by increasing the frequency f of the periodically fluctuating rotation speed of the main spindle motor 3 by a prescribed amount of change fx (x: a positive value less than 1) is set as a new amplitude f, and the processing advances to Step S27.

In Step S26, a value (f−fx) obtained by decreasing the frequency f of the periodically fluctuating rotation speed of the main spindle motor 3 by a prescribed amount of change fx (x: a positive value less than 1) is set as a new amplitude f, and the processing advances to Step S27.

In Step S27, the fluctuation command calculation unit 11 calculates a fluctuation command based on the amplitude a and the frequency f.

Figure 7:
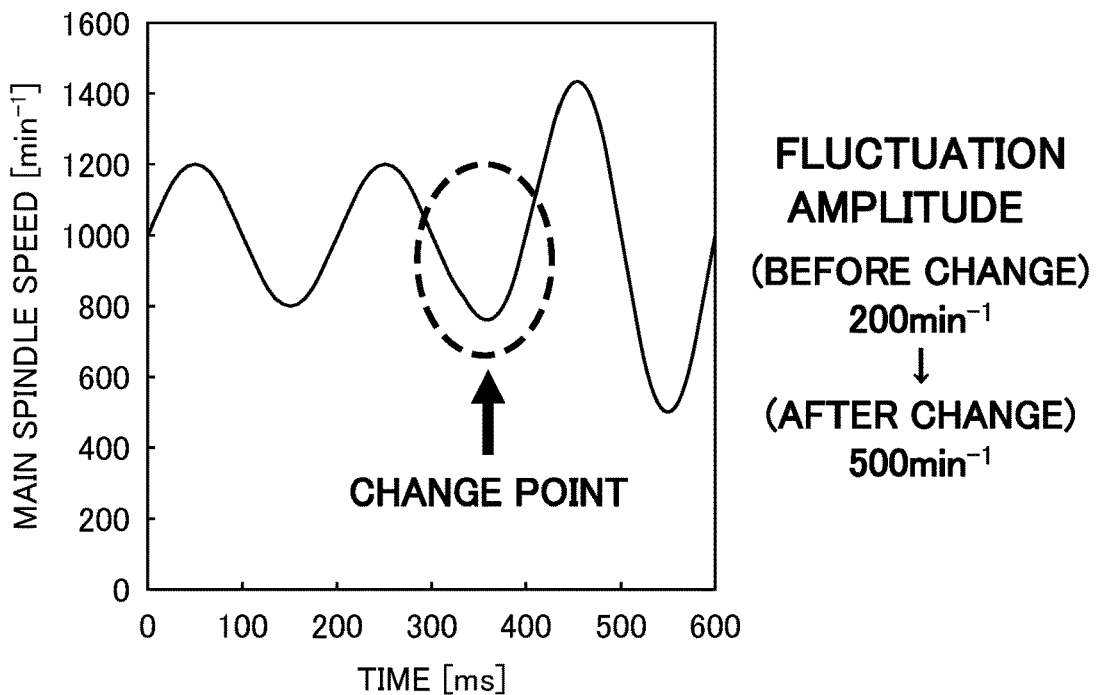
FIG. 7 shows a time history when the amplitude of the periodically fluctuating rotation speed (main spindle speed) of a main spindle motor is increased in the second embodiment.

FIG. 7 shows a time history when the amplitude of the periodically fluctuating rotation speed (main spindle speed) of the main spindle motor 3 is increased in the second embodiment. As shown in FIG. 7, when the amplitude of the periodically fluctuating main spindle speed of 1000±200 [min$^{-1}$] of the main spindle motor 3 is increased, and the main spindle speed is set to 1000±500 [min$^{-1}$], the amplitude gradually increases. That is, after the amplitude is changed, the main spindle speed of the main spindle motor of the present embodiment changes smoothly.

Figure 8:
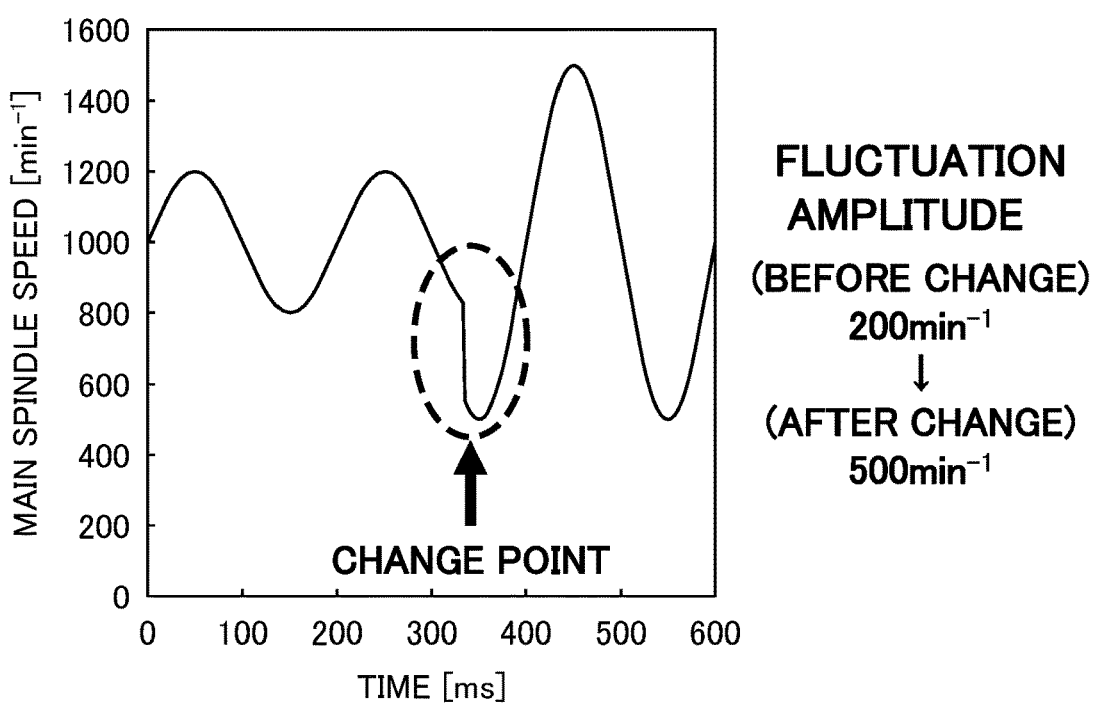
FIG. 8 shows a time history when the amplitude of the periodically fluctuating rotation speed (main spindle speed) of a conventional main spindle motor is increased.

FIG. 8 shows a time history when the amplitude of the periodically fluctuating rotation speed (main spindle speed) of a conventional main spindle motor is increased. As shown in FIG. 8, the amplitude of the periodically fluctuating spindle speed of 1000±200 [min$^{-1}$] of the conventional spindle motor 3 is increased, and the main spindle speed is set to 1000±500 [min$^{-1}$], the amplitude rapidly increases. That is, after the amplitude is changed, the main spindle speed of the conventional main spindle motor rapidly changes.

Figure 9:
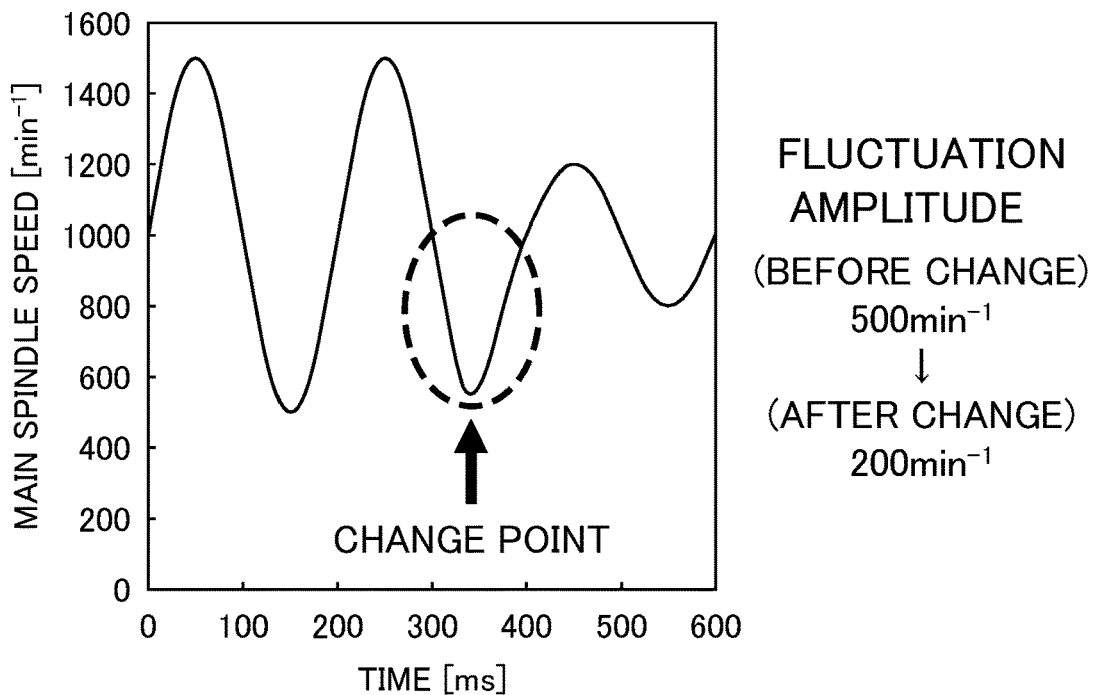
FIG. 9 shows a time history when the amplitude of the periodically fluctuating rotation speed (main spindle speed) of the main spindle motor is decreased in the second embodiment.

FIG. 9 shows a time history when the amplitude of the periodically fluctuating rotation speed (main spindle speed) of the main spindle motor 3 is decreased in the second embodiment. As shown in FIG. 9, the amplitude of the periodically fluctuating main spindle speed of 1000±500 [min$^{-1}$] of the main spindle motor 3 is decreased, and the main spindle speed is set to 1000±200 [min$^{-1}$], the amplitude attenuates (gradually decreases). That is, after the amplitude is changed, the rotation speed of the main spindle motor 3 of the present embodiment changes smoothly.

Figure 10:
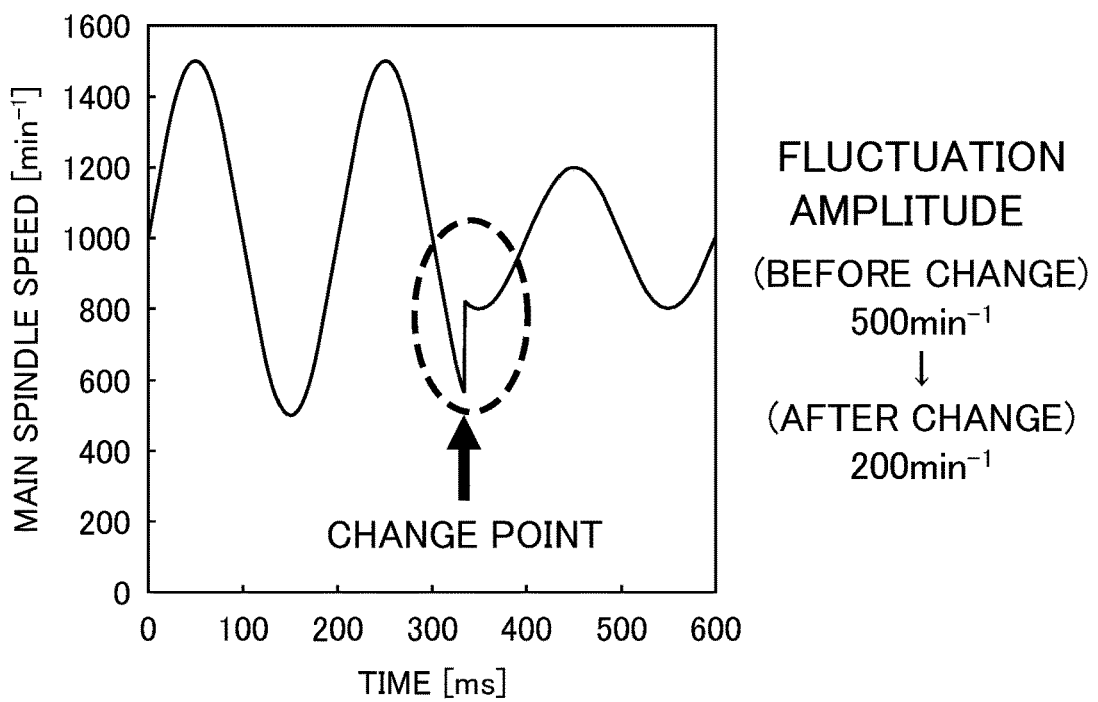
FIG. 10 shows a time history when the amplitude of the periodically fluctuating rotation speed (main spindle speed) of the conventional main spindle motor is decreased.

FIG. 10 shows a time history when the amplitude of the periodically fluctuating rotation speed (main spindle speed) of the conventional main spindle motor is decreased. As shown in FIG. 10, the amplitude of the periodically fluctuating main spindle speed of 1000±500 [min$^{-1}$] of the conventional main spindle motor is decreased, and the main spindle speed is set to 1000±200 [min$^{-1}$], the amplitude suddenly decreases. That is, after the amplitude is changed, the main spindle speed of the conventional main spindle motor rapidly changes.

Figure 11:
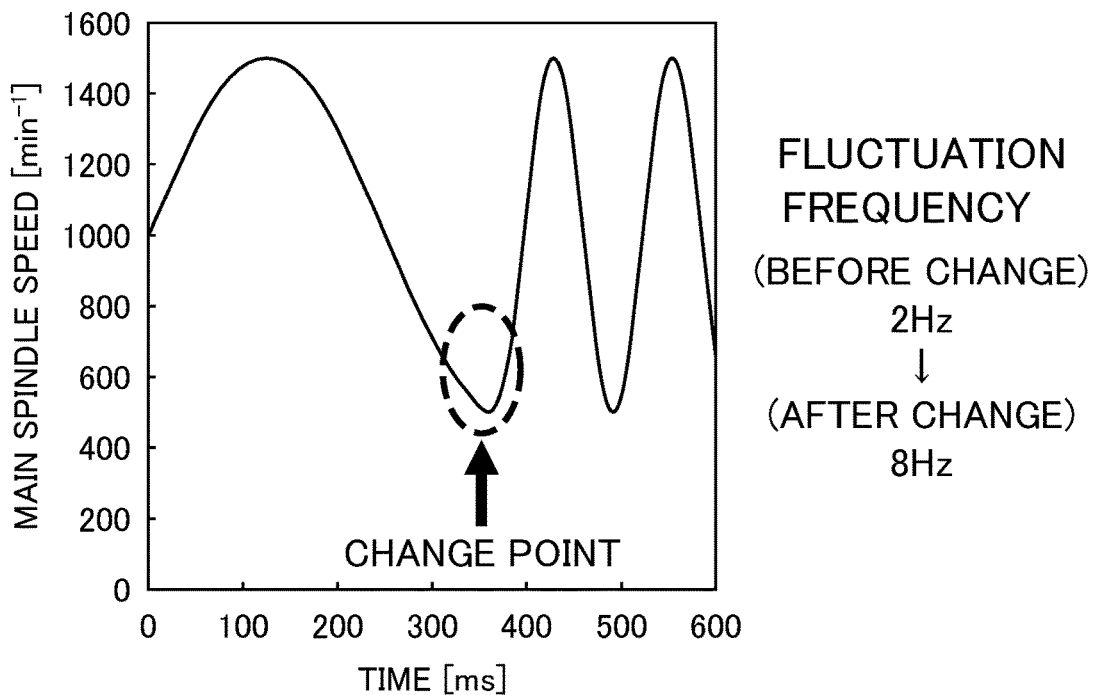
FIG. 11 shows a time history when the frequency of the periodically fluctuating rotation speed (main spindle speed) of the main spindle motor is increased in the second embodiment.

FIG. 11 shows a time history when the frequency of the periodically fluctuating rotation speed (main spindle speed) of the main spindle motor 3 is increased in the second embodiment. As shown in FIG. 11, when the fluctuation frequency of the periodically fluctuating main spindle speed of 1000±500 [min$^{-1}$] of the main spindle motor 3 is increased from 2 [Hz] to 8 [Hz], the frequency gradually increases. That is, after the frequency is changed, the main spindle speed of the main spindle motor 3 of the present embodiment changes smoothly.

Figure 12:
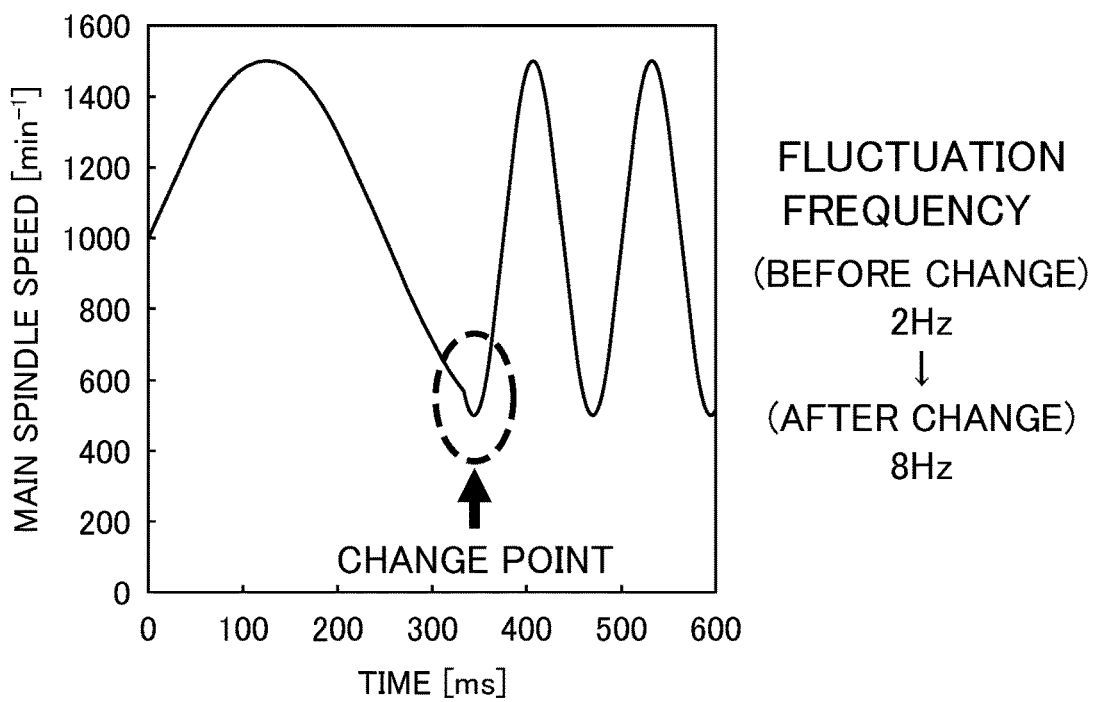
FIG. 12 shows a time history when the frequency of the periodically fluctuating rotation speed (main spindle speed) of the conventional main spindle motor is increased.

On the other hand, FIG. 12 shows a time history when the periodically fluctuating rotation speed (main spindle speed) of the conventional main spindle motor is increased. As shown in FIG. 12, when the fluctuation frequency of the periodically fluctuating main spindle speed of 1000±500 [min$^{-1}$] of the conventional main spindle motor is increased from 2 [Hz] to 8 [Hz], the frequency rapidly increases. That is, after the frequency is changed, the main spindle speed of the conventional main spindle motor rapidly changes.

Figure 13:
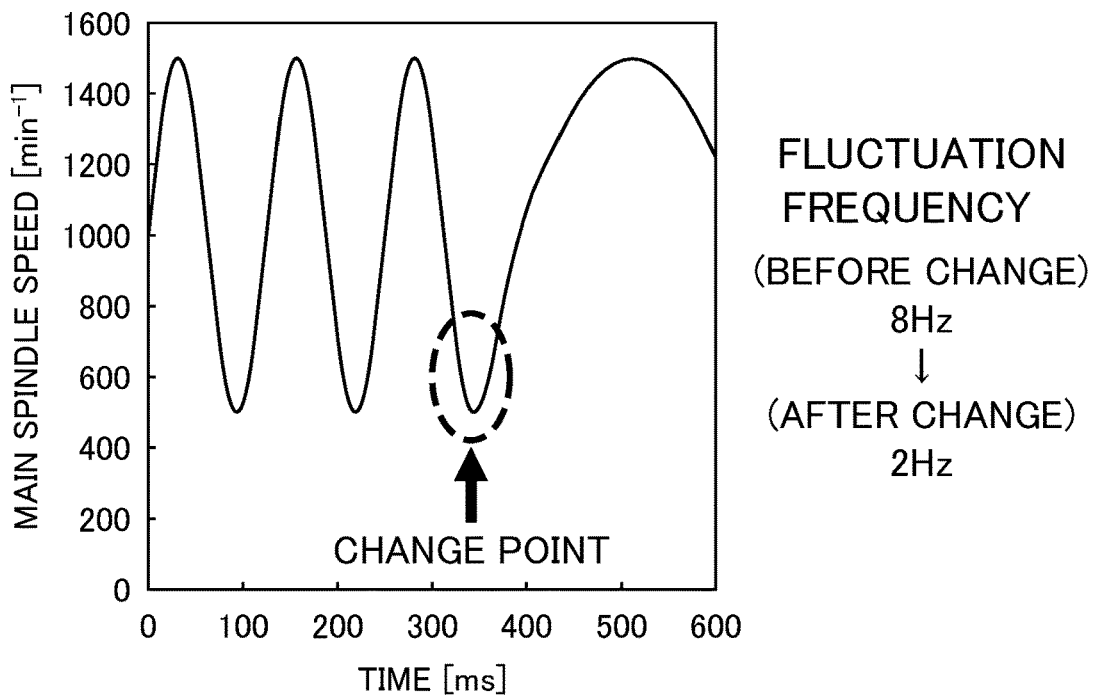
FIG. 13 shows a time history when the frequency of the periodically fluctuating rotation speed (main spindle speed) of the main spindle motor is decreased in the second embodiment.

FIG. 13 shows a time history when the frequency of the periodically fluctuating rotation speed (main spindle speed) of the main spindle motor 3 is decreased in the second embodiment. As shown in FIG. 13, when the fluctuation frequency of the periodically fluctuating main spindle speed of 1000±500 [min$^{-1}$] of the main spindle motor 3 is decreased from 8 [Hz] to 2 [Hz], the frequency attenuates (gradually decreases). That is, after the frequency is changed, the main spindle speed of the main spindle motor 3 of the present embodiment changes smoothly.

Figure 14:
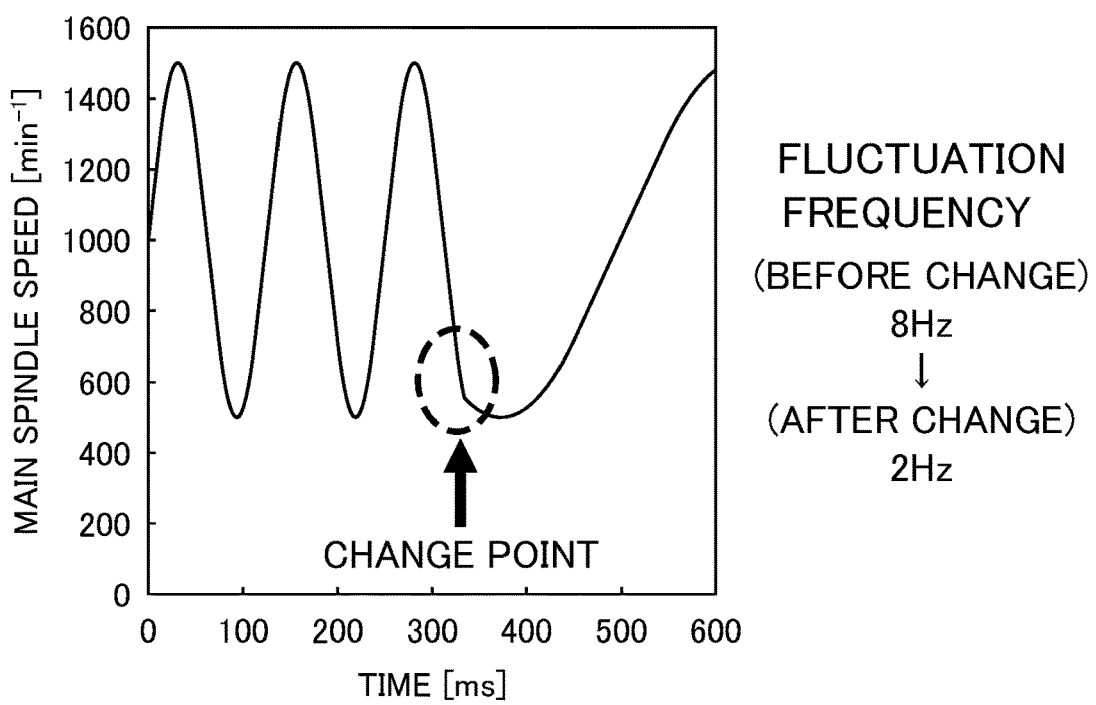
FIG. 14 shows a time history when the frequency of the periodically fluctuating rotation speed (main spindle speed) of the conventional main spindle motor is decreased.

On the other hand, FIG. 14 shows a time history when the frequency of the periodically fluctuating rotation speed (main spindle speed) of the conventional main spindle motor is decreased. As shown in FIG. 14, when the fluctuation frequency of the periodically fluctuating main spindle speed of 1000±500 [min$^{-1}$] of the conventional main spindle motor is decreased from 8 [Hz] to 2 [Hz], the frequency rapidly decreases. That is, after the frequency is changed, the main spindle speed of the conventional main spindle motor rapidly changes.

As described above, the motor control device 1A according to the second embodiment includes the fluctuation command calculation unit 11 that calculates a fluctuation command based on a speed command for the main spindle motor 3 of the machine tool and a fluctuation condition for causing the rotation speed of the main spindle motor 3 to periodically fluctuate, and the speed control unit 14 that controls the rotation speed of the main spindle motor 3 based on the speed command and the fluctuation command. The fluctuation command calculation unit 11 calculates, when the fluctuation condition is changed, a fluctuation command in which the amplitude of a periodically fluctuating rotation speed and/or the frequency of the periodically fluctuating rotation speed gradually changes. As a result, according to the motor control device 1A, since the steepness of the speed change is made gentle, it is possible to reduce adverse effects due to rapid changes in periodic fluctuations in the rotation speed of the main spindle motor 3 while maintaining an effect of suppressing regenerative self-excited chatter vibration.

Furthermore, the fluctuation command calculation unit 11 compares, when the fluctuation condition is changed, the values of the amplitude of the periodically fluctuating rotation speed and/or the frequency of the periodically fluctuating rotation speed before and after the change. The fluctuation command calculation unit 11 calculates, when the value after the change is greater than the value before the change, a fluctuation command in which the amplitude of the periodically fluctuating rotation speed and/or the frequency of the periodically fluctuating rotation speed gradually increases. The fluctuation command calculation unit 11 calculates, when the value after the change is smaller than the value before the change, a fluctuation command in which the amplitude of the periodically fluctuating rotation speed and/or the frequency of the periodically fluctuating rotation speed attenuates. As a result, according to the motor control device 1A, it is possible to more reliably reduce adverse effects due to rapid changes in periodic fluctuations in the rotation speed of the main spindle motor 3 while maintaining an effect of suppressing regenerative self-excited chatter vibration.

Embodiments of the present invention have been described above. The motor control devices 1 and 1A can be implemented by hardware, software, or a combination thereof. Furthermore, the control methods performed by the motor control devices 1 and 1A can also be implemented by hardware, software, or a combination thereof. It is to be noted that being implemented by software means being implemented by a computer reading and executing a program.

EXPLANATION OF REFERENCE NUMERALS 1, 1A motor control device (control device for machine tool)
11 fluctuation command calculation unit
12 fluctuation stop determination unit
12A fluctuation condition setting unit
14 speed control unit
16 current control unit
17 current detection unit
2 numerical control device
21 main spindle speed commander
3 main spindle motor
31 speed detection unit

The invention claimed is:

1. A control device for a machine tool, comprising:
a fluctuation command calculation unit configured to calculate a fluctuation command based on a speed command for a main spindle motor of the machine tool and a fluctuation condition for causing a rotation speed of the main spindle motor to periodically fluctuate;
a speed control unit configured to control the rotation speed of the main spindle motor based on the speed command and the fluctuation command; and
a fluctuation stop determination unit configured to calculate a stop command for stopping a fluctuation of the rotation speed based on a predetermined trigger,
wherein the fluctuation command calculation unit being configured to calculate, when the fluctuation condition is changed, the fluctuation command in which an amplitude of the rotation speed that periodically fluctuates and/or a frequency of the rotation speed that periodically fluctuates gradually changes, and wherein the fluctuation command calculation unit is configured to calculate, when receiving the stop command as the fluctuation condition, the fluctuation command in which the amplitude of the rotation speed that periodically fluctuates attenuates to zero.

2. A control device for a machine tool, comprising:

a fluctuation command calculation unit configured to calculate a fluctuation command based on a speed command for a main spindle motor of the machine tool and a fluctuation condition for causing a rotation speed of the main spindle motor to periodically fluctuate; and a speed control unit configured to control the rotation speed of the main spindle motor based on the speed command and the fluctuation command, wherein the fluctuation command calculation unit being configured to calculate, when the fluctuation condition is changed, the fluctuation command in which an amplitude of the rotation speed that periodically fluctuates and/or a frequency of the rotation speed that periodically fluctuates gradually changes, and wherein the fluctuation command calculation unit is configured to compare, when the fluctuation condition is changed, values of the amplitude of the rotation speed that periodically fluctuates and/or the frequency of the rotation speed that periodically fluctuates before and after the change, and to calculate, when the value after the change is greater than the value before the change, the fluctuation command in which the amplitude of the rotation speed that periodically fluctuates and/or the frequency of the rotation speed that periodically fluctuates gradually increases, and to calculate, when the value after the change is smaller than the value before the change, the fluctuation command in which the amplitude of the rotation speed that periodically fluctuates and/or the frequency of the rotation speed that periodically fluctuates attenuates.

* * * * *